United States Patent [19]

Hollister et al.

[11] Patent Number: 4,575,106
[45] Date of Patent: Mar. 11, 1986

[54] HIGH PRESSURE SEALING CONNECTION WITH METAL SEAL

[75] Inventors: F. Harold Hollister, Houston; Tri C. Le, Missouri City; Danny S. Meyer, Richmond, all of Tex.

[73] Assignee: Joy Manufacturing Company, Pittsburgh, Pa.

[21] Appl. No.: 653,104

[22] Filed: Sep. 21, 1984

[51] Int. Cl.[4] ............................................... F16J 15/08
[52] U.S. Cl. ............................... 277/167.5; 277/206 R
[58] Field of Search .................. 277/206 R, 236, 167.5

[56] References Cited

U.S. PATENT DOCUMENTS

| 3,519,278 | 7/1970 | Fuhrmann et al. | 277/206 R |
|---|---|---|---|
| 4,261,584 | 4/1981 | Browne et al. | 277/206 R |
| 4,408,771 | 10/1983 | Shelton | 277/206 R |

Primary Examiner—Robert I. Smith
Attorney, Agent, or Firm—Marvin J. Marnock

[57] ABSTRACT

A high pressure sealing connection for sealing between coaxially aligned members (22, 10) which are connected by metal bolt means having a different coefficient of thermal expansion from the aligned members. The connection comprises a metallic sealing ring (40) having at its largest external diameter a curved arcuate peripheral surface 52 characterized by a center of curvature which is co-diametral with the center of the seal ring but may be of greater or lesser radius than the radius of the ring. At its inner periphery, upper and lower flanges (61, 62) extend inwardly and perpendicularly to the axis of the ring. The coaxially aligned members (22, 10) are provided with recesses defined by opposed internal frusto-conical sealing surfaces (41, 42) at their adjoining ends, each tapering inwardly from the end of the member to an annular shoulder (43, 44) in the bore of the aligned member. The frusto-conical surfaces (41, 42) are of equal taper in the range of 5 degrees to 20 degrees. Drawing the coaxially aligned members together by suitable bolt means (31) results in a compression of ring (40) and a sealing relationship between the ring and the aligned members which is enhanced by fluid pressure energization. The internal flanges (61, 62) significantly increase the elastic zone of the ring to include the flanges themselves which continue to urge the seal ring in sealing engagement with the aligned members even after high pressure or temperatures have caused a deformation of the sealing ring or the aligned members. The curved outer surface of the seal ring in conjunction with the tapered frusto-conical surfaces of the seal grooves permits the points of sealing contact to roll as the geometry changes with differential thermal expansion.

5 Claims, 4 Drawing Figures

HIGH PRESSURE SEALING CONNECTION WITH METAL SEAL

BACKGROUND OF THE INVENTION

This invention relates to high pressure sealing joints or connections and more particularly to an annular bore seal for sealing between first and second coaxially aligned tubular members having different coefficients of thermal expansion or which are joined together by metal fastening means having a different coefficient of thermal expansion. The present invention has, as its primary object, the provision of a high pressure bore seal with a unique metallic sealing ring which maintains elasticity at its sealing surface areas and the ability to maintain a fluid-tight seal under high pressure and high temperature conditions even though the joined members or the fastening means for the joined members may have a different coefficient of thermal expansion.

During a fire, several conditions occur which cause conventional seals and gaskets to fail. First and most obvious, many conventional seals utilize non-metallic materials on the sealing surfaces and these materials break down or degrade at high temperatures such as to cause the seal to leak. Also, the high alloy bolting materials needs for high temperature and fire resistant applications, are almost always of different material than the joined tubular members. Accordingly, with heat, the bolts expand a greater amount than the low and intermediate alloy steels of which the flanges are made. This differential thermal expansion results in a reduction of the bolting preload. Most conventional seals and gaskets depend on bolt loading to produce the contact pressure necessary to effect a seal and if the contact pressure is reduced by thermal expansion to less than the contained fluid pressure, the seal will leak. If flange separation occurs, conventional gaskets will fail castastrophically.

Another condition which adversely effects conventional seal designs during a fire is the distortion of the seal grooves with heat. This problem is further complicated by the fact that the seal grooves of the mating flanges do not distort in the same way or in the same amount in a fire due to uneven heat distribution and differences between the cross sections of the mating flanges. A conventional gasket design sandwiches a sealing material between two flanges. Uneven radial deformation will damage the sealing surface and result in a leak.

Other seal designs, such as shown in U.S. Pat. No. 4,408,771 depend on mismatched angles between the sealing ring and the cooperating sealing surface to produce the necessary contact pressure for sealing. As the seal grooves deform during a fire, these seals are pushed outward by pressure to follow the outward movement of the groove. The accompanying loss of desirable physical properties of the sealing ring such as tensile strength and yield strength of the seal may result in bending of the seal ring and loss of the mismatch. Also, if the grooves of the joined members deform by different amounts, angular mismatch will be altered or eliminated with the least bit of outward radial deformation. A reduction in angular mismatch increases the contact area, decreasing the contact pressure. If the contact pressure at any point is less than the contained pressure, the seal will leak.

SUMMARY OF THE INVENTION

The subject invention which is a high pressure sealing connection for sealing between connected first and second coaxially aligned members comprises a metallic sealing ring having an arcuate outer sealing surface about its external periphery. The arcuate surface is defined in radial cross section by a circular arc with a center of curvature at a radial distance which may be greater or less than that of the ring but co-diametral therewith. At its inner periphery, the ring is formed with upper and lower flanges which extend inwardly in a substantially perpendicular relationship to the cental axis of the ring. The coaxially aligned members which are to be joined are provided with end recesses which define opposed internal frusto-conical sealing surface at their adjoining ends, each tapering inwardly from the end of the member and terminating at an annular radial shoulder formed by an enlargement of the bore of the aligned member. The internal frusto-conical surfaces are of equal taper in the range of 5 degrees to 20 degrees. In unloaded condition, the initial contact of the sealing ring with the coaxially aligned members is near the upper and lower edges of the sealing ring. Drawing the coaxially aligned members together by suitable bolt means results in a compression of the ring which effects a fluid sealing relationship between the adjacent surfaces of the ring and the aligned members which is enhanced by fluid pressure energization.

It is also an object to provide a bore sealing connection which provides a seal under atmospheric pressure and temperature conditions but is pressure energizable to provide enhanced sealing capability under high pressure conditions. The internal flanges of the ring significantly increase the elastic zone of the ring which includes the flanges themselves and extends from the end surfaces of the ring between plastic zones located intermediate the end surfaces and adjacent the inner and outer peripheries of the ring to provide elastic end portions of the ring. Under normal operating conditions, fluid pressure cannot act on the outside of the ring because of the initial seal and since the pressure inside the ring is not counteracted by pressure on the outside of the ring, the ring hoops outward but is restrained by the seal groove. This increases the contact pressure between the seal and seal groove permitting the seal to contain higher pressure. Because the area on the inside of the seal acted on by pressure exceeds the contact area on the outside of the seal, the contact pressure will always exceed the applied pressure and effective sealing is provided. The elastic flanges continue to urge the seal ring int its sealing engagement with the aligned members even after high pressure or temperatures have cause some deformation of the sealing ring or the aligned members.

In the seal design of the invention, the elasticity in the ring and the contained fluid pressure act together to push the seal ring outward against the seal groove so that contact pressure is maintained even with flange separation. The curved outer surface of the seal ring combined with the tapered surface of the seal groove permit this seal to maintain annular line contact with the seal groove even if the seal ring bends and/or the seal grooves deform radially by different amounts due to different coefficients of thermal expansion.

DESCRIPTION OF A PREFERRED EMBODIMENT

Figure 1:
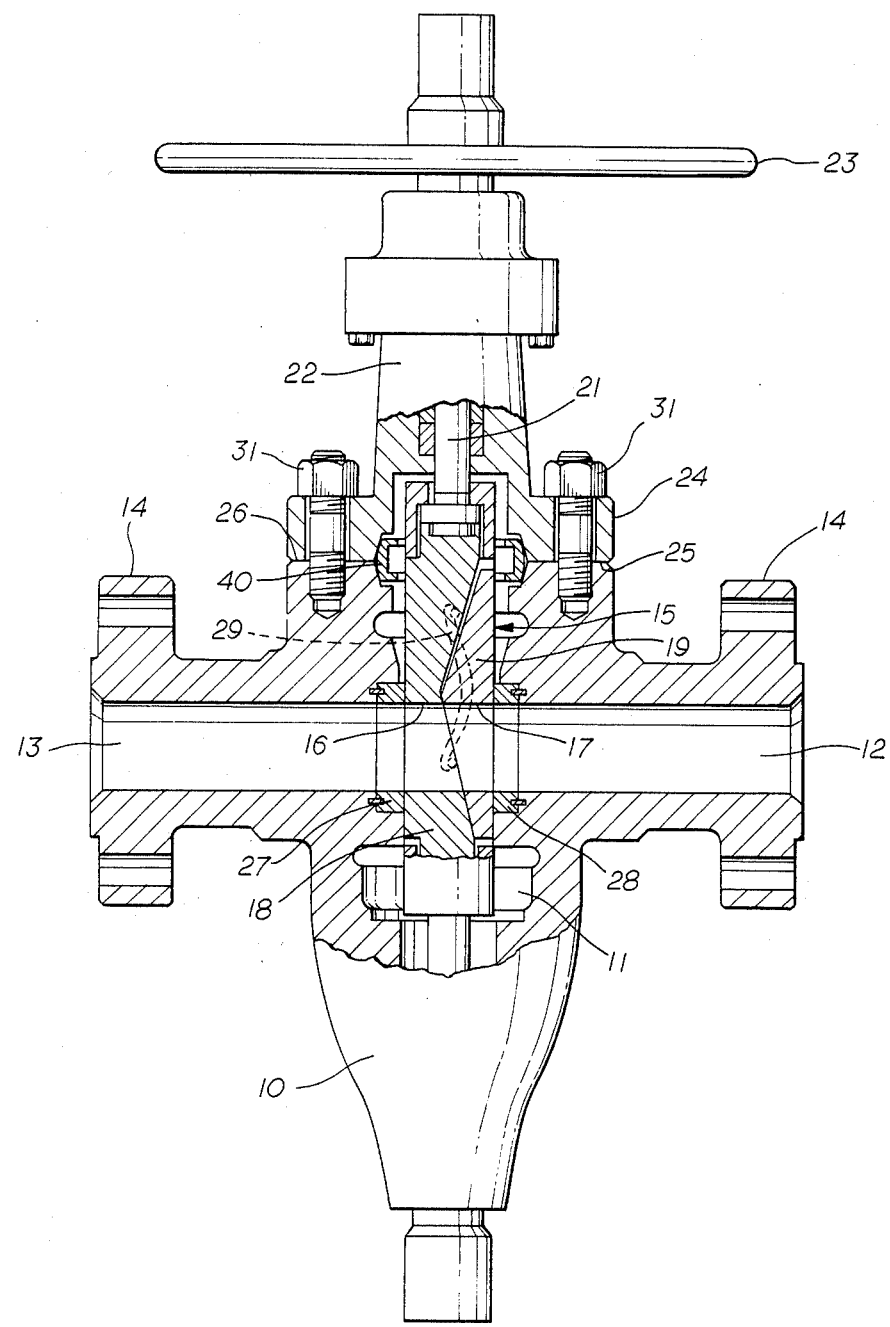
FIG. 1 is a sectional view of an expansible gate valve with the upper portion of the valve shown in elevation and utilizing an annular seal member in accordance with a preferred embodiment of the invention for effecting a fluid-tight seal between the valve bonnet and the valve body.

Referring to the drawings in greater detail, the invention is illustrated herein in connection with a gate valve which utilizes the principle of parallel expanding gates for obtaining a positive mechanical seal on the upstream and downstream sides of the gate assembly. The valve in FIG. 1 which illustrates a typical application of the high pressure sealing connection of this invention includes a valve body 10 provided with a valve chamber 11 and inlet and outlet flow passages 12 and 13 which are in communication with the valve chamber 11 to form a flow way through the valve. Flanges 14 at the ends of the valve body provide means for connecting the valve in a flowline.

Within the valve chamber 11 a gate assembly 15 is mounted for sliding movement transversely of the flow passages to open or close the flow way. The gate assembly 15 comprises a gate member 18 and a segment 19. The gate member 18 is connected at its upper end to a valve stem 21 which extends through the valve bonnet 22 which is bolted atop the valve body 10 and closes the upper end of the valve chamber 11. At its upper end the stem 21 is provided with a valve actuated handwheel 23. The valve shown is of the rising stem type and the stem 21 is connected to the gate member 18 so that upon rotation of the handwheel the gate assembly is prevented from rotation but is movable across the flow way to open or close the valve. In the valve open positions, ports 16, 17 in the gate and segment members, respectively, are aligned in registry with the inlet and outlet passages 12 and 13.

As is typical of expansible gate assemblies, the gate member 18 is provided with a V-shaped recess which accommodates the wedge shaped sgement 19, the wedge face of which conform to the surfaces of the V-shaped recess and are in contact therewith. Also, characteristically, the linear movement of the gate assembly to open or close the valve causes an expansion of the gate assembly in both its open and closed positions due to relative sliding movement between the gate and segment members 18 and 19 as induced by suitable stops (not shown) in the valve chamber 11 for limting the vertical movement of the segment 19 relative to the gate 18. When expanded, the gate assembly seals against seat rings 27 and 28 mounted in annular recess which surround the flow passages 12 and 13 and open to the valve chamber 11. The gate assembly 15 is also provided with bow springs 29 which are fixed to the sides of the gate assembly and bias the gate assembly towards a collapsed condition wherein the segment member 19 is nested in the V-shaped recess of the gate member 18. Accordingly, when in transit between the open and closed positions the gate assembly 15 is in collapsed contacted condition and the valve chamber 11 is exposed to the flowline pressure.

It is also seen that the bonnet 22 is secured to the valve body by a plurality of studs or bots 31 which pass through a radial flange 24 on the lower end of the bonnet. The central bore which extends through the bonnet and receives the valve stem 21 is enlarged at the valve chamber 11 for accommodating the gate assembly 15. The flat end surface 25 of the bonnet is superimposed against the flat annular surface 26 of the valve body when the bonnet is in bolted engagement atop the valve body 10.

Figure 2:
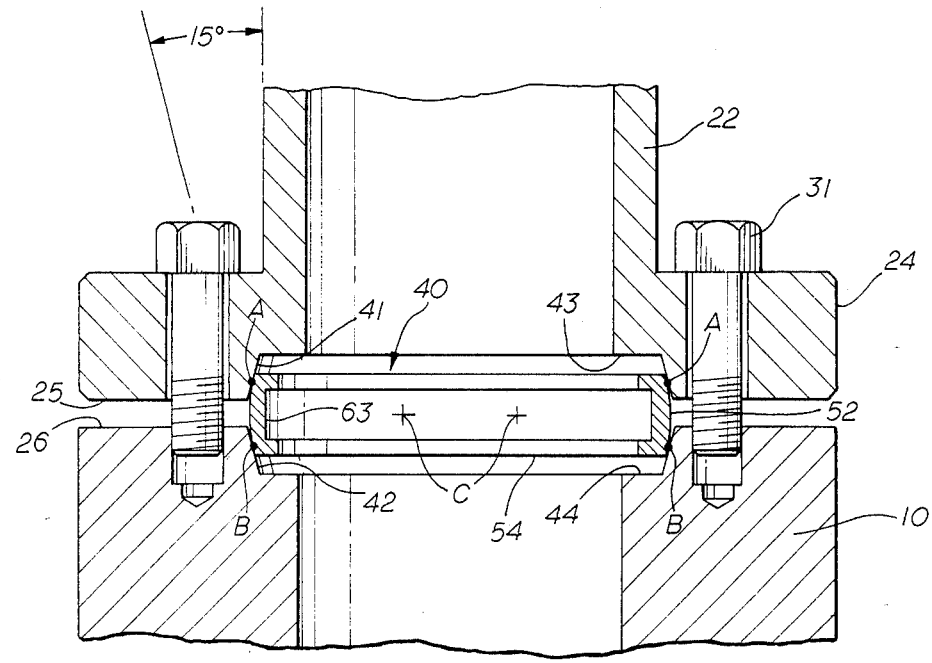
FIG. 2 is a detailed cross-sectional view of the seal ring member of the present invention and its relationship with the valve members shown in FIG. 1 prior to bolting of the valve bonnet to the valve body.

As shown in FIG. 1, the unique metal sealing ring 40 of this invention is installed at the joint between the bonnet 22 and the valve body 10 to effect a fluid-tight seal under all pressure conditions. The sealing ring 40 is shown installed between the valve bonnet 22 and the valve body 10 in the condition wherein the bonnet and the valve body are not bolted tightly together. In FIG. 2, it will be seen that the bonnet 22 is provided with an internal groove in its axial bore at the lower end thereof which provides for an internal inward facing frusto-conical surface 41 which tapers inwardly from the lower planar surface 25 of the bonnet and terminates at an annular radial shoulder 43. In the example shown the frusto-conical surface 41 is provided with a taper of approximately 15 degrees corresponding to a cone angle of 30 degrees. In similar fashion the upper end of the valve body 10 is provided with an internal groove opening into the valve chamber 11 and providing an upward facing frusto-conical surface 42 which extends downwardly and inwardly from the upper end surface 26 of the valve body 10. The frusto-conical surface 42 does not extend into the valve chambe but instead terminates at an upward facing radial extending annular shoulder 44. The frusto-conical surface 42 is also provided with a taper of 15 degrees and is symmetrical to the frusto-conical surface 41.

The seal ring 40 is provided with an external arcuate surface 52 having in radial cross section a circular arc with a center of curvature C of a radius less than that of the seal ring 40 but co-diametral therewith. It is to be noted, of course, that for other valves or tubular members as will hereinafter by explained the center of curvature may be at a radial distance which is greater than that of the seal ring. At its interior the ring 40 is provided with a pair of upper and lower inwardly extending radial flanges 61 and 62. The flanges 61, 62 have equal diameters and are separated by the cylindrical surface 63 of the ring which is of a greater diameter than the inner diameters of the flanges 61 and 62.

Figure 3:
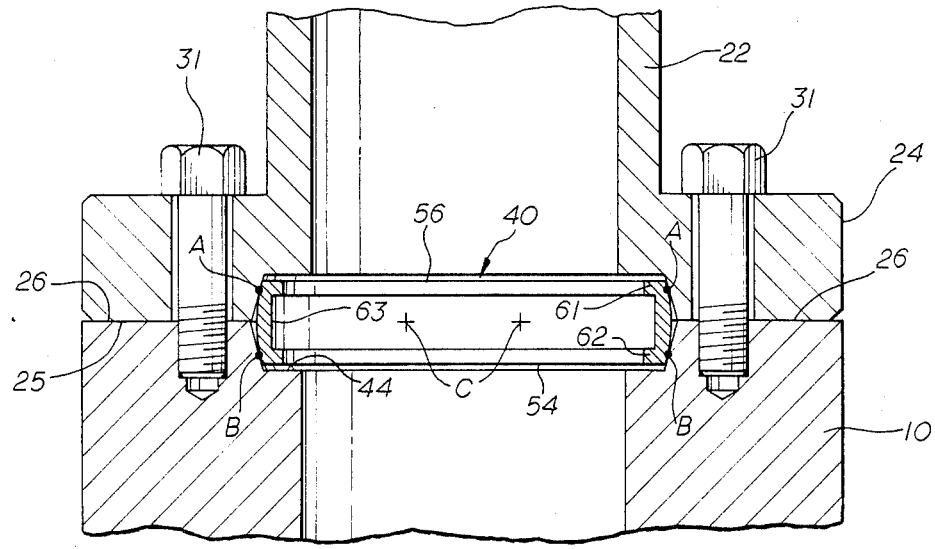
FIG. 3 is a detailed cross-sectional view of the seal ring member of the invention and its relationship with a pair of coaxially aligned tubular members such as the valve bonnect and valve body of FIG. 2 and showing the seal ring member in the condition of effecting a fluid-tight seal therebetween.

In FIG. 3 the metal ring 40 is shown as it is installed to provide a fluid-tight seal between the valve bonnet 22 and the valve body 10 in a manner hereinafter explained. It will be seen in FIG. 3 that the axial dimension of the ring 40 is less than that of the sum of the axial dimensions of the frusto-conical surfaces 41 and 42 of the valve bonnet and the valve body. This provides for a clearance gap between the upper surface 56 of the ring 40 and the downward facing radial shoulder 43 of the valve bonnet 22 and a corresponding clearance between the lower surface 54 of the ring 40 and the upward facing radial shoulder 44 of the valve body 10. Preferably this clearance is in the range of 0.001 inch to 0.015 inches but is shown exaggerated for purposes of illustration. This minimal clearance avoids axial compression of the ring and tends to prevent seal cocking and subsequent unloading at the seal tips.

Accordingly, it will be seen in FIG. 2 that in the unloaded condition, the initial point of contact between the ring and the valve bonnet and valve body is at the upper and lower annular edges of the ring wherein its arcuate external surface 52 makes contact with the frusto-conical surfaces 41 And 42 of the bonnet and valve body, respectivley, as shown by points A and B. When torque is applied to the bonnet bolts 31 there is a very high stress line contact at the annular seal edges. Clearances between the ring and the valve bonnet and valve body operate to keep the ring centralized and allow the seal to align itself with these members. Finite element analysis has shown that the flanges or nubs 61 and 62 on the internal diameter of the ring 40 are very elastic and continue to urge the seal tips or corners of the ring toward the valve body and the valve bonnet even after high pressure or thermal cycles have slightly deformed the sealing members. When compressed as shown in FIG. 3, the elastic zone of the ring extends from its upper annular surface 56 to its lower annular surface 54 and between the plastic zones of permanent deformation which are confined to an area immediately behind the external cylindrical surface 51 of the ring and a second area immediately adjacent the inner cylindrical surface 63.

It has been demonstrated that when the valve chamber 11 is subjected to very high fluid pressures the selaing ring 40 expands in diameter and the inwardly extending flanges 61 and 62 are flexed or bent toward one another. The flanges or nubs 61 and 62 because of their elastic nature in effect keep the contact between the ring and the bonnet and valve body members loaded. The flexing forces exerted by the ring against the internal frusto-conical surfaces of the valve bonnet and valve body are substantially perpendicular thereto. In this respect, it is essential that the inner flanges 61, 62 extend substantially radially and perpendicularly towards the axis of the ring.

It is also to be noted that the seal is pressure energized since the area of the inner peripheral surface of the ring which is acted on by fluid pressure is substantially larger than the area of contact of the ring and coaxial members. Accordingly, the countering forces applied to the outer sealing surface of the ring are applied in smaller areas and fluid-tight sealing is established. Also, the relatively larger elastic zones in the sealing ring increases the reuseability of the ring and the corresponding smaller plastic zones of the ring render it far less susceptible to hydrogen sulfide embrittlement than convention bore seals.

Figure 4:
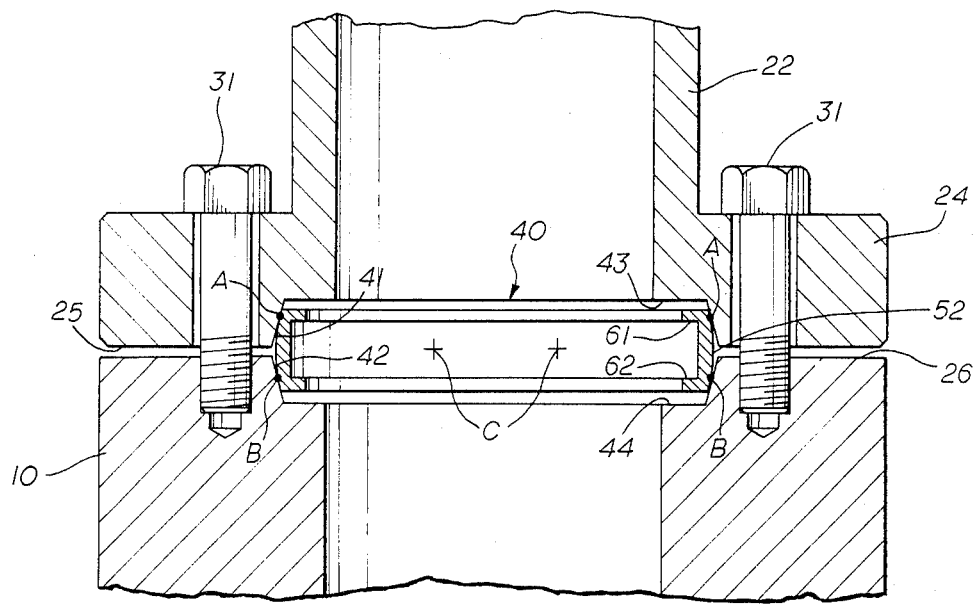
FIG. 4 is a detailed cross-sectional view showing the seal ring of FIG. 3 in the condition of effecting a fluid-tight seal with the coaxially aligned tubular members after extreme high temperature has caused a separation of the tubular members.

In FIG. 4 the seal ring 40 is shown in the valve wherein the bonnet flange 24 has become separated from the valve body due to differential thermal expansion, and with the upper flange seal groove with surface 41 being larger in diameter than the lower groove with surface 42 because of the different cross section due to different thermal expansion of the valve parts. As can be seen, the points or lines of contact between the seal ring 40 and the seal grooves as indicated by points A and B in FIGS. 2, 3, and 4 have shifted with the change in geometry. The curved outer surface 52 of the seal ring combined with the tapered surface of a seal groove permits the points or line of contact to roll as the geometry changes. Line contact is maintained so the contact area and fluid pressure remain constant.

The seal design of this invention is adapted to compensate for considerable variation in the coefficients of thermal expansion between the flange bolts and the valve body and valve bonnet. The flange bolts are usually of different stronger material than the valve body and valve bonnet which are usually of identical materials, but not always.

In a recent fire test, this seal design was used between the body and bonnet of a gate valve as shown herein. Immediately after extinguishing the fire a gap of 0.020 inch was measured between the valve body and bonnet due to differential thermal expansion. There was no leakage detected past the seal during the test. After the test, when the valve was disassembled, there was 0.014 inch difference between the diameter of the seal groove in the body and bonnet, which is attributable to permanent plastic deformation.

It is to be noted that in selecting the design of the external arcuate surface of the seal ring 40, the magnitude of the acruate surface radius is a function of both the seal's axial dimension and seal groove angle of taper and is designed so that the point of contact between the seal and the seal groove is a specific distance from the annular top or bottom surface of the seal. This permits the seal ring of contact to roll in response to seal groove deformation without shifting the seal point beyond the top or bottom of the seal ring. The magnitude of this contact radius may therefore be less than or greater than the outer radius of the seal.

It will, therefore, be seen that a unique metallic sealing ring and high pressure sealing connection is described herein which is specifically adapted for maintaining a fluid-tight seal under high pressure, high temperature fire conditions even though the joined members or the fastening means for the joined members may have different coefficients of thermal expansion.

It is to be understood that the foregoing description of a preferred embodiment of the invention has been presented for purposes of illustration and description and is not intended to limit the invention to the precise form disclosed. For example, while an angle of taper of 15 degrees is disclosed for the internal frusto-conical surfaces of the coaxially aligned members, a taper in the range of five degrees to twenty degrees is acceptable depending on the particular application. Furthermore, while the invention has been illustrated as part of a gate valve construction, it is also suitable for use as a high pressure connection in a wellhead assembly or in pipelines generally particularly where sealing is required under fire conditions and differential thermal expansion is expected. It is to be appreciated therefore, that the changes may be made by those skilled in the art to suit particular applications of the invention without departing from the spirit of the invention.

What is claimed is:

1. A high pressure sealing connection for sealing between connected first and second coaxially aligned members which are provided with central bores and are connected by metal bolt means having a different thermal coefficient of expansion than said aligned members, said first and second aligned members being each provided with an internal annular recess at the end thereof which is connected adjacent to the other of said members, each recess being defined by an internal frusto-conical sealing surface tapering inwardly from the end of the member and terminating at an annular radial shoulder formed by an enlargement of the bore in said member;

a metallic sealing ring for sealing between said connected first and second coaxially aligned members when positioned in said recesses, said sealing ring having an external diameter which exceeds the bore diameter of the coaxially aligned members measured at their adjoining ends and upper and lower annular end surfaces which reside in planes transverse to the axis of the sealing ring, said sealing ring having;

an external peripheral surface characterized by a convex arcuate configuration as defined in radial cross section by a center of curvature of radius which is co-diametral with the center of said ring whereby when said metallic sealing ring is positioned in said annular recesses in coaxial alignment with said bores and its inner peripheral surface exposed to said bore the upper and lower annular edges of the external peripheral surface respectively of the metallic sealing ring initially provide the only points of engagement with the internal frusto-conical seating surfaces of the coaxially aligned members;

upper and lower radial flanges extending into the interior of said ring at the upper and lower ends of said sealing ring, respectively, in a direction radial and perpendicular to the axis of the ring and sealing ring having an enlarged bore section as defined by a central inner peripheral surface intermediate said upper and lower radial flanges and extending therebetween; and said bolt means being adapted for drawing said coaxially aligned members to apply a compressive force on said sealing ring in the axial direction of said ring for effecting a fluid sealing relationship between the surface of the sealing ring and the tapered surfaces of the coaxially aligned members such that the Annular line of sealing contact between said ring and each said coaxially aligned member shifts to a location intermediate the annular ends of said sealing ring as compression is applied by said bolt means and the fluid sealing relationship is enhanced by fluid pressurization within the coaxially aligned members and maintained during thermal expansion and contraction of said seal ring and the aligned members.

2. A high pressure sealing connection as recited in claim 1 wherein said first and second coaxially aligned members are the valve bonnet and valve body of a high pressure valve.

3. A high pressure sealing connection as recited in claim 1 wherein said internal frusto-conical sealing surfaces of the first and second coaxially aligned members are provided with an equal angle of taper in the range of 5 degrees to 20 degrees.

4. A high pressure sealing connection as recited in claim 1 wherein the center of curvature of the external arcuate convex surface is of a radius which is less than the radius of the seal ring.

5. A high pressure sealing connection as recited in claim 1 wherein the center of curvature of the external arcuate convex surface is of a radius which is greater than that of a seal ring.

* * * * *